(12) United States Patent
Sumi

(10) Patent No.: US 10,669,387 B2
(45) Date of Patent: Jun. 2, 2020

(54) THIN FILM MATERIAL FOR PROCESSING USE

(71) Applicant: TBM CO., LTD., Chiyoda-ku, Tokyo (JP)

(72) Inventor: Yuichiro Sumi, Tokyo (JP)

(73) Assignee: TBM CO., LTD., Tokyo (JP)

( * ) Notice: Subject to any disclaimer, the term of this patent is extended or adjusted under 35 U.S.C. 154(b) by 230 days.

(21) Appl. No.: 14/760,576

(22) PCT Filed: Dec. 27, 2013

(86) PCT No.: PCT/JP2013/085225
§ 371 (c)(1),
(2) Date: Jul. 13, 2015

(87) PCT Pub. No.: WO2014/109267
PCT Pub. Date: Jul. 17, 2014

(65) Prior Publication Data
US 2015/0353695 A1 Dec. 10, 2015

(30) Foreign Application Priority Data
Jan. 11, 2013 (JP) ................................ 2013-003619

(51) Int. Cl.
| | | |
|---|---|---|
| B32B 27/20 | (2006.01) |
| C08J 5/18 | (2006.01) |
| C08K 3/26 | (2006.01) |
| C09D 129/04 | (2006.01) |
| C08K 5/098 | (2006.01) |

(52) U.S. Cl.
CPC ................. *C08J 5/18* (2013.01); *B32B 27/20* (2013.01); *C08K 3/26* (2013.01); *C08K 5/098* (2013.01); *C09D 129/04* (2013.01); *C08J 2323/06* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 6,194,506 B1 | 2/2001 | Ochiai et al. | |
| 6,432,550 B1 * | 8/2002 | Ohbayashi | B32B 27/10 428/511 |
| 6,984,423 B2 | 1/2006 | Iida et al. | |
| 7,255,918 B2 * | 8/2007 | Watanabe | D21H 19/36 428/340 |
| 2002/0041060 A1 | 4/2002 | Liang | |
| 2003/0118790 A1 | 6/2003 | IIda et al. | |
| 2014/0100328 A1 * | 4/2014 | Sumi | C08J 5/18 524/587 |

FOREIGN PATENT DOCUMENTS

| | | |
|---|---|---|
| CN | 1215649 A | 5/1999 |
| EP | 0908322 A1 | 4/1999 |
| EP | 1264705 A1 | 12/2002 |
| JP | H11277623 A | 10/1999 |
| JP | 2001080208 A | 3/2001 |
| JP | 2001205927 A | 7/2001 |
| JP | 2003320744 A | 11/2003 |
| TW | I304374 B | 12/2008 |
| WO | 2012165311 A1 | 12/2012 |

OTHER PUBLICATIONS

Machine translation of JP 2003-320744 A to Maeda et al.*
Extended European search report for European Patent Application No. 13870635.3-1306/2944668 PCT/JP2013/085225; dated Dec. 1, 2015.
International Search Report corresponding to Application No. PCT/JP2013/085225; dated Mar. 11, 2014, with English translation.
Office Action for Taiwanese Patent Application No. 103100946; dated Jan. 11, 2017.
European Office Action corresponding to EP Patent Application No. 13870635.3, dated Jun. 23, 2017.
Jin Ho Lee et al., "Characterization of Wettability Gradient Surfaces Prepared by Corona Discharge Treatment," Journal of Colloid and Interface Science, vol. 151, No. 2, Jul. 1991; pp. 563-570.
SIPO Final Rejection corresponding to Application No. 201380069743.8; dated Nov. 6, 2019.
SIPO Office Action corresponding to Application No. 201380069743.8; dated Apr. 16, 2018.
SIPO Office Action corresponding to Application No. 201380069743.8; dated Feb. 28, 2017.
SIPO Office Action corresponding to Application No. 201380069743.8; dated Sep. 25, 2017.
Yuqing Wan et al., "Characterization of surface property of poly(lactide-co-glycolide) after oxygen plasma treatment," Biomaterials 25; (2004) pp. 4777-4783.

* cited by examiner

*Primary Examiner* — Vu A Nguyen
(74) *Attorney, Agent, or Firm* — Cantor Colburn LLP

(57) ABSTRACT

Provided is a plastic thin film material, on which a process material can be applied or deposited at low cost and with high efficiency, and in which an inorganic substance powder capable of achieving a functional processing for enabling the strong adhesion of a laminated layer on the thin film material is filled at a high density. A thin film material for processing use, which contains a thermoplastic resin and an inorganic substance powder at a weight ratio of 18:82 to 50:50, and has a specific gravity of 0.60 to 1.40 inclusive and a degree of absorption of water of 0.0 to 11.0 $g/m^2 \cdot 120$ sec inclusive as measured by a Cobb method in accordance with JIS P 8140.

5 Claims, No Drawings

THIN FILM MATERIAL FOR PROCESSING USE

This is the U.S. national stage of application No. PCT/JP2013/085225, filed on Dec. 27, 2013. Priority under 35 U.S.C. § 119(a) and 35 U.S.C. § 365(b) is claimed from Japanese Application No. 2013-003619, filed Jan. 11, 2013, the disclosure of which is also incorporated herein by reference.

TECHNICAL FIELD

The present invention relates to a thin film material for processing use to which process materials firmly and efficiently adhere.

BACKGROUND ART

Among inorganic substances, calcium carbonate can be easily and inexpensively purchased anywhere, since its raw material, limestone, exists abundantly on the earth. Therefore, plastic thin film materials comprising a high amount of calcium carbonate have been recently proposed as environment-friendly paper, and practical use thereof has begun. (Patent Document 1)

The thin film materials are expected to be used similarly in the wide range of fields where paper and plastic are used, but currently their use is limited to a very narrow range due to quality issues.

On the other hand, conventional paper made of pulp is generally shipped after its qualities are made suitable for applications, for instance, by modifying papering methods or applying various chemicals such as a paper strength enhancer or process materials. However, since air permeability of paper is high and accordingly these chemicals, etc. easily permeate spaces between fibers of pulp, it was necessary to increase the application amount to at least equal to or higher than the permeate amount of the functional chemicals or process materials in order to secure even adhesion of the functional chemicals or process materials.

In the field of rapidly developing functional materials, the need for thin film is also high. While a film which has good air permeability has been developed by drawing of a film, on the other hand, there is a need for a thin film material which allows functional chemicals to adhere efficiently at a low cost.

While in the case where functional chemicals are made to adhere to a thin film material, it is important that the functional chemicals adhere firmly to the thin film material; specifically, as the polarity of polyethylene or polypropylene, etc. is low, the adhesional force is weak when these materials are coated or laminated. Therefore, a film substrate is often subjected to physical or chemical treatment to modify the surface, and then, subjected to processing treatment.

Surface modification for improving the adhesiveness of a film roughly depends upon the following two effects.

The first is a method wherein the surface is roughened mechanically or by means of corrosion so as to increase adhesional forces by an anchoring effect. The other is a method to form electrically polar functional groups on the surface by chemical reaction so as to increase adhesional forces.

However, addition of the afore-mentioned processing treatment step to manufacturing process of thin film materials incurs an increase in costs for thin film materials. Therefore, such addition is one of the causes to impede the realization of practical use of thin film materials.

Patent Document 1: Japanese Unexamined Patent Application, Publication No. H11-277623

DISCLOSURE OF THE INVENTION

Problems to be Solved by the Invention

The present invention has been made in light of the above-mentioned situation. In order to use a plastic thin layer material in which an inorganic substance powder is highly blended, over a wide range of applications, the present invention aims to provide a thin film material for processing use on which a process material can be applied or vapor deposited at low cost and with high efficiency, and to which a laminated layer adheres firmly.

Means for Solving the Problems

The present inventors have found that using as a substrate a thin film material in which inorganic substance powder is highly blended and subjecting this to drawing treatment enables the thin film material to adhere to a process material evenly and firmly; and that the adhered amount also can be reduced, resulting in a completion of the present invention. More specifically, the present invention provides the following.

The first aspect of the present invention is a thin film material for processing use, which contains a thermoplastic resin and an inorganic substance powder at a weight ratio of 18:82 to 50:50, and has a specific gravity of 0.60 or more and 1.40 or less and a water absorptiveness as measured by a Cobb method in accordance with JIS P 8140 of 0.0 g/m2·120 sec. or more and 11.0 g/m2·120 sec. or less.

The second aspect of the present invention is a process for manufacturing a laminate film by laminating a process material on the surface of the thin film material of the first aspect.

Effects of the Invention

Since the thin film material for processing use having the characteristics of the present invention allows for a reduction in the amount of the process material adhered in processing and enables the process material to adhere firmly and thereby processing at low cost and with high efficiency is possible, the thin film material for processing use of the present invention can be used widely as a substrate for functional materials or as recording materials or as wall paper in the field of architectural materials.

PREFERRED MODE FOR CARRYING OUT THE INVENTION

Below, the embodiments of the present invention will be explained in detail. However, the present invention is not limited to the following embodiments, and can be practiced by adding modification as needed, provided that the modification is in a range of the objects of the present invention.

First Embodiment

The first embodiment of the present invention is a thin film material for processing use, which contains a thermoplastic resin and an inorganic substance powder at a weight ratio of 18:82 to 50:50, and has a specific gravity of 0.60 or more and 1.40 or less and a water absorptiveness as measured by a Cobb method in accordance with JIS P 8140 of 0.0 g/m2·120 sec or more and 11.0 g/m2·120 sec or less.

Incidentally, in the present invention, the thin film material refers to a substrate in the form of a sheet and the thin film material for processing use refers to a thin film material on which a process material is laminated and used. The process material refers to a composition for constituting a functional layer which is formed on the thin film material by coating and the like so as to provide the thin film material with a desired function.

Below, the thin film material for processing use of the present invention and the preparation method thereof will be explained in detail.

As the thermoplastic resins used as the raw material of the thin film material for processing use, for instance, one or more resins selected from the group consisting of polyethylene, polypropylene, polystyrene and polyethylene terephthalate can be used.

From the perspective of easiness of preparation, it is preferred to use a thermoplastic resin with a melt mass flow rate of 0.02 to 0.5 g/10 min. in an amount of 50% by weight to 100% by weight relative to the total thermoplastic resin, and as the balance, a thermoplastic resin with a melt mass flow rate of 0.5 to 1.2 g/10.0 min. From the perspective of strength of the obtained thin film material, polyethylene resin is preferably used, and in particular, high density polyethylene resin is more preferably used. It is also preferable to use a hard resin, such as polystyrene, in combination with this, in order to increase stiffness of the thin film materials.

As inorganic substance powder which may be used in the present invention, those which may be added to plastic articles as filler, such as calcium carbonate, titanium oxide, silica, clay, talc, kaolin, aluminum hydroxide and the like, may be used without particular limitation. In order to improve dispersibility in the thin film materials for processing use, it is preferable to modify the surface thereof according to conventional methods. It is preferable to use an inorganic substance powder having an average particle size of 15 μm or less in order to prevent the surface roughness of the thin film material from becoming large and to prevent large particles of the inorganic substance powder from separating from the thin film material. In particular, it is preferred not to include particles having a particle size of 50 μm or more in the particle size distribution. On the other hand, if the particles are too fine, the viscosity increases considerably when the inorganic substance powder is kneaded with the thermoplastic resin and it becomes difficult to produce a thin film material and additionally the smoothness of the surface of the thin film material prepared becomes too high. Therefore, the average particle size is preferably 0.5 μm or more. Incidentally, the particle size of the inorganic substance powder in the present invention is a 50% particle size (d50), which is obtained from the cumulative percent distribution curve measured on a laser diffraction particle size distribution analyzer.

The thin film material for processing use according to the first embodiment of the present invention is a thin film material in the form of a sheet for laminating a process material thereon. The thermoplastic resin and the inorganic substance powder each are weighed and mixed in a range of a weight ratio of 18:82 to 50:50, fed into an extrusion molding machine equipped with a twin screw. Since by mixing raw materials each in the afore-mentioned weight ratio, it becomes possible to apply a high shear stress to the fed raw materials, and it becomes possible to disperse each component homogeneously. Consequently an intermediate product such as a thin film material prior to drawing or a pellet, etc. can be suitably manufactured. Moreover, when drawing is performed, it is possible to control an amount of pores which generate around the inorganic substance powder to an appropriate range. Therefore, it is possible to control the final pore volume and a ratio of continuous pores and independent pores to an appropriate range; and accordingly it is possible to control apparent density or air permeability to a desired range which will be stated below.

In addition to the thermoplastic resins and the inorganic substance powder, the thin film materials for processing use of the present invention can contain one or more auxiliary agents selected from the group consisting of lubricants, antioxidants, ultraviolet ray absorbers, coloring pigments, dispersing agents, antistatic agents, flame retardants or the like within a range in which the addition is not contrary to the purpose. The auxiliary agents which are considered to be particularly important among these will be described below by mentioning examples, but the auxiliary agents are not limited thereto.

Examples of lubricants include aliphatic acid-based lubricants such as stearic acid, hydroxystearic acid, stearic acid of complex type and oleic acid, aliphatic alcohol-based lubricants, stearamide, oxy stearamide, oleylamide, erucylamido, ricinolic amide, behenamide, methylol amide, methylenebis-stearamide, methylenebis-stearobehenic amide, bisamide acid of higher aliphatic acids, aliphatic amide-based lubricants such as amide of complex type, etc. n-butyl stearate, methyl hydroxystearate, polyhydric alcohol aliphatic acid esters, saturated fatty acid esters, aliphatic ester-based lubricants, such as ester waxes, aliphatic acid metal soap-based lubricants or the like.

As antioxidants, phosphorus-based antioxidants, phenol-based antioxidants and pentaerythritol-based antioxidants can be used. Phosphorus-based antioxidants, more specifically, phosphorus-based antioxidant stabilizers such as phosphite esters or phosphate esters, etc. are desirably used.

Examples of phosphite esters include triesters, diesters, and monoesters, etc. of phosphite acid, such as triphenyl phosphite, tris(nonylphenyl) phosphite, and tris(2,4-di-tert-butylphenyl) phosphite, etc.

Phosphates include trimethyl phosphate, triethyl phosphate, tributyl phosphate, trioctyl phosphate, triphenyl phosphate, tricresyl phosphate, tris(nonylphenyl) phosphate, 2-ethylphenyl diphenyl phosphate, etc. These phosphorus-based antioxidants may be used alone or in combination of two or more.

Examples of phenol-based antioxidants include α-tocopherol, butylated hydroxytoluene, sinapyl alcohol, vitamin E, n-octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl) phenol, 3,5-di-tert-butyl-4-hydroxy benzyl phosphonate diethyl ester and tetrakis[3-(3,5-di-tert-butyl-4-hydroxyphenyl)propionyloxymethyl]methane.

These may be used alone or in combination of two or more.

The specific gravity of the thin film material for processing use of the present invention is required to be 0.60 or more and 1.40 or less, and preferably 0.80 or more and 1.30 or less. When the specific gravity is within this range, the weight becomes equal to that of normal paper made of pulp, and therefore it is possible to obtain the same impression in use. Moreover, it is possible to make handling methods or mechanical conditions in transportation or others in the processing common with those of ordinary paper.

Here, the specific gravity refers to an apparent specific gravity of a whole of the process material including a thermoplastic resin, inorganic substance powder and pores, namely, the bulk density defined in JIS P8118, and can be obtained by the following equation.

Bulk Density (g/cm2)=basis weight (g/m2)/(bulk thickness (mm)×1000)

Here, the basis weight is the weight (g) per area (m2) (JIS P8124).

A water absorptiveness of the thin film material for processing use of the present invention is required to be 0.0 to 11.0 g/m2·120 sec. as measured by a Cobb method in accordance with JIS P 8140, particularly preferably 0.5 g/m2·120 sec. to 5.0 g/m2·120 sec. The water absorptiveness is a parameter relating to an amount of continuous pores in a thin film material. If the water absorptiveness is in this range, it is possible to form an even film even with a low coating amount because excessive absorption is suppressed in coating a process material. Further, an amount of concave portions formed on the surface of the thin film material is also appropriate and the material can exercise an appropriate anchoring effect. Accordingly, it is possible to form a film which is even and has high adhesion strength, even with a low coating amount of a process material.

The thin film material for processing use of the present invention preferably has an air permeance of 800 seconds or more as measured by the Gurley tester method by JIS P8117. Since the volume of the continuous pores formed in the thin film material decreases, excessive absorption is suppressed, for instance, in applying a process material. Accordingly, it is possible to form a uniform film with a small coating amount.

The thin film material for processing use of the present invention can be manufactured by forming a film from the afore-mentioned constituting materials using conventional means including a calender method, an extrusion method, an inflation method and the like; and subjecting the resulting film to a uniaxial or biaxial drawing process in a longitudinal or a horizontal direction using known methods.

Among the above methods, considering the productivity, the mechanical properties of the resulting thin film materials for processing use, easiness of controlling the film thickness, applicability to various resins, and the load on the environment or the like, the melt extrusion molding is preferred. Inter alia, in order to change a sheet structure so as to control air permeance and specific gravity arbitrarily, it is preferred to adopt a method wherein firstly an intermediate product for thin film material is manufactured by extrusion molding in the T-die method, and then the intermediate product for thin film material is subjected to drawing by means of a simultaneous stretching machine in longitudinal and horizontal directions or to sequential drawing using a longitudinal drawing machine and a horizontal drawing machine.

For the preparation of the intermediate product for thin film material, a method is applicable in which the above constituent materials are mixed in advance in a predetermined mixing ratio, and fed into an extruder in which a T-die is set, to form a film directly while melt kneading. In addition, it is also possible to manufacture the intermediate product for thin film material by pouring constituent materials once into another extrusion molding machine at a predetermined blending ratio, melt kneading them to obtain a master batch and further feeding the obtained pellets or compound into an extrusion molding machine in which a T-die is set. If an extruder to be used is a twin-screw extruder, it is particularly preferred since the action of its strong shear force enables these components to be melted and dispersed homogeneously, and as a result, an inorganic substance powder highly-blended sheet can be easily obtained. In a case where there is no problem with the dispersibility of components to be combined, it is also possible to carry out sheet formation in a single-screw extrusion molding machine in which a T-die is set.

Regarding the thickness of the intermediate product for thin film material of the present invention, any thickness may be selected, depending on applications or in consideration of draw ratio after sheet formation. Considering the film thickness of the final thin film material for processing use obtained from the intermediate product for thin film material, the thickness of the thin film material intermediate product is preferably 40 to 1000 μm, more preferably, 100 to 400 μm. When the thickness of the thin film material intermediate product is less than 40 μm, it is difficult to adjust the specific gravity and the air permeance within the numerical range of the present invention. In addition, when the thickness of the thin film material intermediate product is more than 1000 μm, the drawing becomes difficult. The thickness of the thin film material for processing use after drawing varies depending on the purpose of use, and is 30 to 350 μm, usually 80 to 300 μm is preferably used. The thin film material for processing use having a thickness of less than 30 μm is unsuitable because mechanical properties are poor on account of the filler which is highly blended.

Draw ratio is determined in consideration of the purpose of the use of the thin film material of the present invention and the characteristics of resin used. It is usually 1.2 to 4.0 times, and the material is preferably drawn within the range of 1.5 to 3.0 times.

The required draw ratio can also be calculated by way of calculation. The weight per 1 square meter (also referred to as basis weight) W (g/m2) of the thin film material prior to subjecting to longitudinal drawing is measured, and by using the apparent specific gravity D and the aspect ratio (ratio of draw ratios in longitudinal direction and horizontal direction) R of the product established in production planning, and the target value T (cm) for the thickness of the product after horizontal drawing, the draw ratios (longitudinal direction X times, horizontal direction Y times) are decided according to the following equation. Further, the required draw ratio can be easily estimated based on operational experience from equipment to equipment.

$$X2=W\times 10-4/(D\times Z\times R\times T)$$

$$X=RY \quad \text{(Equation 1)}$$

In the formula, D: apparent specific gravity of the product established in production planning;

R: aspect ratio established in production planning (ratio of draw ratios in longitudinal direction and horizontal direction);

W: weight per one square meter (g) of thin film material prior to subjecting to longitudinal drawing;

X: draw ratio in longitudinal direction;

Y: draw ratio in horizontal direction;

Z: the contraction ratio or extension ratio of the length in the horizontal direction of the sheet due to longitudinal drawing.

When this drawing is performed at a temperature which is 30° C. to 40° C. lower than the melting point of the raw material resin, pores are likely to be formed in the thin film material, which is preferred. In particular, in a case where a high density polyethylene resin is used, drawing is preferably performed at 95° C. to 105° C.

As the pores are formed during the drawing, the specific gravity of the thin film material for processing use decreases. Further, upon combining longitudinal drawing with horizontal drawing and setting the draw ratios appropriately, the formed independent pores are linked to each other, so that continuous pores are partly formed, and thereby it is possible to obtain a range of suitable air permeance of the present invention. However, when the longitudinal drawing and the horizontal drawing each are increased to 2 times or more, the air permeance of the resulting thin film material may become 200 seconds or lower, which may not be preferred for the purpose of the present invention. On the other hand, in most of the thin film material which has been drawn within the afore-mentioned range of draw ratio so that the specific gravity becomes not more than 1.4 and not less than 0.6, the water absorptiveness remains in the range of 0 to 5.0 g/m2·120 sec.

It is desirable to surface modify both or one surface of the afore-mentioned thin film material for processing use, depending upon purposes. As the surface modification, many treatment methods are known, such as provision of hydrophilicity or gas barrier property and the like. It is possible to select from these an appropriate method which can provide a desired function.

For instance, in order to render a thin film material for processing use hydrophilic, it is possible to coat or dip the thin film material for processing use as a substrate by using a water-based treatment agent containing a water-soluble polymer as a main agent, or to apply oxygen plasma treatment, etc. In the case of former, it is preferable to cross link cation group-containing water-soluble polymers in the water-based treatment agent with a specific amount of water-soluble cross-linking agent. The water-soluble polymers which may be used may be either polymers which are water soluble per se, such as polyvinyl alcohol or polyacrylic acid, or polymers which have been rendered water soluble only after the introduction of various cation groups.

While the degree of hydrophilicity provided to the thin film material for processing use varies depending upon the process material which is to be formed later, it is preferred to control the contact angle in the determination of water contact angle according to JIS R3257:1999 to 90 degrees or less, preferably 40 degrees or more and 90 degrees or less. When the water contact angle exceeds 90 degrees, it becomes substantially difficult to form a uniform layer with a process material.

Further, in the present invention, in the case where surface modification is performed for providing gas barrier property, a gas barrier layer comprising, for instance, silicon oxide is formed on the surface of a thin film material for processing use under vacuum. In order to realize a high gas barrier property, plasma chemical vaporization deposition (CVD) is preferred presently, and it is possible to form a film on one side or both sides of the thin film material for processing use. At this time, it is preferred to perform continuous vapor deposition in a winding scheme of thin film material for processing use in the form of roll. For instance, it is possible to use a known vacuum vapor deposition film forming apparatus of winding type. Here, as a plasma generator, a low temperature plasma generator including direct current (DC) plasma, low-frequency plasma, high-frequency plasma, pulse wave plasma, tripolar structure plasma, microwave plasma, etc. is used.

The gas barrier layer comprising silicon oxide laminated by the plasma CVD method can be formed by using a silane compound having carbon in the molecule and oxygen gas as raw materials. It is possible to form a film by adding an inert gas to these raw materials. As examples of silane compounds having carbon in the molecule, silane compounds with relatively low molecular weight, such as tetraethoxysilane (TEOS), tetramethoxysilane (TMOS), tetramethylsilane (TMS), hexamethyldisiloxane (HMDSO), tetramethyldisiloxane, and methyltrimethoxysilane, etc. can be selected. One or plural of these silane compounds may be selected.

In the film formation by the plasma CVD method, a film is formed by introducing a mixture of the vaporized silane compound with oxygen gas between the electrodes and applying electric power by a low temperature plasma generator so as to generate plasma. Here, film properties of the barrier layer can be varied in various methods, for instance, by changing silane compounds, types of gas or mixing ratio of a silane compound and oxygen gas, or by increasing or decreasing applied electric power or the like.

It is possible to obtain a laminate film which is adapted to wide range of applications by adopting a desired process material for the thin film material for processing use so as to provide a functional layer. Examples of layers formed by the process material include, but are not limited to, an ink receiving layer, anti-static layer, a metal layer, a printing coloring layer, and an adhesive layer, etc. Further, it is possible to form a laminate by selecting plural layers from these. The details will be explained in the subsequent second embodiment.

Second Embodiment

The second embodiment of the present invention is a method for manufacturing a laminated film by laminating a process material on the surface of the thin film material of the first embodiment.

It is possible to laminate a functional layer on the surface of the thin film material of the first embodiment in know methods, for instance, by coating a process material in the form of solution or by vapor depositing a process material in the form of liquid or solid. After drawing and before providing a functional layer, it is possible to treat the intermediate product of thin film material obtained by drawing, on a calendar so as to improve smoothness of the surface of the thin film material.

Below, as an example of methods of forming a functional layer manufactured by using a process material, explanation will be given with respect to a case where a surface modifying layer and an ink receiving layer for an image receiving sheet for ink jet are provided, but process materials and functional layers of the present invention are not limited thereto.

As the ink receiving layer, those comprising at least water-soluble resin, inorganic fine particles and a dye mordant can be used. Examples of water-soluble resins include polyvinyl alcohol (PVA), cellulose-based resins (methyl cellulose (MC), ethyl cellulose (EC), hydroxyethyl cellulose (HEC), carboxymethyl cellulose (CMC), etc.), chitins, starch, polyethylene oxide (PEO), polypropylene oxide (PPO), polyethylene glycol (PEG) and polyvinyl ether (PVE), polyacrylamide (PAAM) and polyvinyl pyrrolidone (PVP), polyacrylic acid salts, maleic acid resins, alginic acid salts, gelatins and the like. It is possible to adopt at least one from these.

As fine inorganic particles, for instance, silica fine particles, colloidal silica, calcium silicate, zeolite, kaolinite, halloysite, white mica, talc, calcium carbonate, calcium sulfate, and boehmite, pseudoboehmite, etc. are used. Among these, silica fine particles are preferable. As for the average primary particle size of the fine inorganic particles, 20 nm or less (preferably 10 nm or less, particularly 3 to 10 nm) is preferable.

Since silica particles are likely to attach to each other by hydrogen bonding on account of silanol groups on the surface, in the case where the average primary particle size is 10 nm or less as above, it is possible to form a structure with a high porosity, so that absorption features of ink can be improved. Among silica particles, there is a difference between hydrous silica and anhydrous silica, for instance, with respect to density of silanol groups on the surface, or presence or absence of pores. Accordingly, hydrous silica and anhydrous silica exhibit different properties. Anhydrous silica is especially likely to form a three dimensional structure with a high porosity, which is preferable.

The ratio of the fine inorganic particles and the water-soluble resin has a considerable influence on the film structure of the ink receiving layer. As the ratio becomes larger, the porosity, the pore volume and the specific surface area (per unit weight) become larger. When the ratio exceeds 10, there is no effect to film strength and cracks occurring when the film is dry. When the ratio is less than 1.5, pores are likely to be clogged with resin, so that the porosity decreases, resulting in lowered ink absorption performance. For example, when anhydrous silica having an average primary particle size of 10 nm or less and water-soluble resin are completely dispersed in an aqueous solution at a ratio of 2 to 5, followed by coating and drying, a three dimensional network structure comprising a chain unit of secondary particles of silica particles is formed, so as to obtain a porous translucent film having an average pore size of 30 nm or less, a porosity of 50% or more, a specific pore volume of 0.5 ml/g or more, and a specific surface area of 100 m2/g or more.

With respect to the coating liquid for the ink receiving layer formation, the inorganic fine particles are added into water and dispersed under the conditions of a high speed rotation of 5000 to 20000 rpm, generally for 10 to 30 minutes, using a disperser such as a high-speed rotary wet colloidal mill (for instance, Clare Mixture, manufactured by M technique Co., Ltd.), and then, water-soluble resin is further added and dispersed under the same conditions as the above. When a dye mordant is added to coating liquid for ink receiving layer formation, a dye mordant can be added at the end and dispersed so as to obtain a coating liquid. The thus obtained coating liquid is a homogeneous sol. By using this, a coating layer is formed on a support in the coating methods described below, and thereby an ink receiving layer having a three dimensional network structure can be obtained.

In order to form an ink receiving layer, it is desirable to use a cross linker to cure the water-soluble resin, in addition to the afore-mentioned components. By using a cross linker, generation of cracks is prevented during coating and drying. Examples of usable cross linkers include borax, boric acid, borates, meta borates, tetraborates, pentaborates, methylol urea, resol resins, polyisocyanates, and epoxy group-containing curing agents, etc. Further, particularly when gelatin is used as the water-soluble resin, the following compounds which are known as film-curing agent for gelatin can be used as a cross linker. Aldehyde-based compounds such as formaldehyde, glyoxal, and glutaraldehyde, etc.; ketone-based compounds such as diacetyl and cyclopentanedione, etc.; active halides such as bis(2-chloroethylurea)-2-hydroxy-4,6-dichloro-1,3,5-triazine, 2,4-dichloro-6-S-triazine sodium salt, etc.; active vinyl compounds such as divinyl sulfonic acid, 1,3-vinyl sulfonyl-2-propanol, N,N'-ethylene bis(vinyl sulfonyl acetamide), 1,3,5-triacryloyl-hexahydro-S-triazine, etc.; N-methylol compounds such as dimethylol urea and methylol dimethyl hydantoin, etc.; isocyanate-based compounds such as 1,6-hexamethylene diisocyanate, etc.; aziridine-based compounds; carboxy imide-based compounds; epoxy-based compounds such as glycerol triglycidyl ether, etc.; ethyleneimino-based compounds such as 1,6-hexamethylene-N,N'-bisethylene urea, etc.; halogenated carboxy aldehyde-based compounds such as mucochloric acid and mucophenoxychloric acid, etc.; dioxane-based compounds such as 2,3-dihydroxydioxane, etc.; chromium alum, potassium alum, zirconium sulfate, and chrome acetate, etc. Incidentally, it should be noted that these cross linkers can be used either alone or in combination of two or more.

It is preferred that the cross linker is not added to the coating liquid for ink receiving layer, but a solution of cross linker is prepared separately and applied concurrently with the application of the coating liquid for ink receiving layer whose major components are inorganic fine particles and water-soluble resin (multilayer application). Alternatively, it is also preferred that a solution of cross linker is applied to the layer from the coating liquid for ink receiving layer before the layer comes to show a decreasing drying rate. Further, instead of adding a dye mordant into the coating liquid for ink receiving layer, it is also preferable to apply similarly the solution of cross linker in which a dye mordant has been also added.

Because, in the case of ink-jet record, since it is necessary for the layer thickness of an ink receiving layer to have sufficient absorption capacity to absorb all the droplets, it is necessary to determine this in relation to the porosity of the coating film. For example, if an amount of ink is 8 nL/mm2 and the porosity is 60%, a film with a film thickness of approximately 15 μm or more is necessary. Upon considering this point, in the case of ink jet record, it is preferable for an ink receiving layer to have a film thickness in the range of 10 to 50 μm.

The coating liquid to form an ink receiving layer of the present invention may comprise various inorganic salts and acid alkali as a pH controlling agent in order to increase the dispersibility of particles in addition to inorganic fine particles, a water-soluble resin and a dye mordant as well as a cross linker. Also, various surfactants may be used for the purpose of improving suitability for application and surface quality. Surfactant having ion conductivity or metal oxide fine particles having electronic conductivity may be contained in order to suppress frictional charging and delamination charging on the surface or to control surface electrical resistance in electrophotography. Also, various matting agents may be included for the purpose of reducing surface friction properties. Furthermore, various antioxidants, ultraviolet ray absorbents, and singlet oxygen quenchers may be contained for the purpose of suppressing deterioration of coloring materials.

In the present invention, formation methods of ink receiving layer are not particularly limited and known methods can be adopted, as long as the receiving layer can be formed by the method. Preferred methods may be adopted appropriately in considering the properties of the coating liquid for ink receiving layer formation and the like. Specifically, an ink receiving layer can be formed by applying a coating liquid for forming an ink receiving layer to a thin film material for processing use by the spraying method, the roll coater method, the blade coater method, the no coater method, or the curtain coater method, etc., followed by drying. Further, a substrate thin film material which has been subjected to primer treatment beforehand may be used. Before forming an ink receiving layer on a thin film material for processing use, it is preferred to form a surface modifying layer to provide the thin film material for processing use with the above-mentioned hydrophilicity for better quality of the resulting receiving layer.

EXAMPLES

Subsequently, the present invention will be explained in detail based on the Examples, but the present invention will not be limited thereto.

Example 1

Direct molding was performed wherein a high density polyethylene resin and calcium carbonate powder were provided in a weight ratio adjusted to 40:60 and further magnesium stearate was added so that its content was 1% by weight relative to the both raw materials, and then, an intermediate product for thin film material was formed simultaneously while mixing and kneading were performed by using a co-rotation extrusion molding machine equipped with a T die. With respect to the resulting intermediate products of thin film material with one having a thickness of 270 um and the other a thickness of 350 um, longitudinal drawing was performed by utilizing a circumferential velocity difference between rolls and using a width of an original sheet of 305 mm, an inlet velocity of 0.7 m/min., and a temperature at a drawing section of 95° C.

With respect to the drawn thin film materials, the specific gravity, the water absorptiveness by the Cobb method, the air permeance by the Gurley tester method and the surface roughness (indicated by center line average roughness Ra) were measured. The results are indicated in Table 1.

TABLE 1

| No. | Draw ratio (times) | Thickness of original sheet (times) | Specific gravity | Water absorptiveness (g/m2 · 120 sec.) | Air permeance (seconds) | Surface roughness Ra(μm) MD | TD |
|---|---|---|---|---|---|---|---|
| 1 | 1.4 | 270 | 1.39 | 0.5 | 1300 or more | 1.3 | 1.3 |
| 2 | 2.0 | 270 | 1.25 | 2.1 | 1300 or more | 2.5 | 1.6 |
| 3 | 1.6 | 350 | 1.19 | 3.6 | 1300 or more | 1.7 | 1.7 |
| 4 | 2.5 | 270 | 1.04 | 10.9 | 1300 or more | 3.5 | 2.1 |

In the Examples, the characteristic evaluation of each sample was performed as follows.
(Specific Gravity)

Specific gravity was obtained by dividing a basis weight (g/m2) of each sample by thickness (mm).
(Water Absorptiveness)

The water absorptiveness refers to a degree of absorption of water measured in the case where one side of paper and cardboard specified in JIS P8140 is brought into contact with water for a specified time period. The specified contact time period is basically 120 seconds, but the time period can be varied as necessary.

In the present invention, measurement was also performed according to JIS P8140. Specifically, the mass of a test specimen of approximately 15 cm×15 cm was measured to 1 mg unit and the test specimen was fixed to a flat pedestal and a cylinder with an examination area of 100 cm2 with clamps. Deionized water was poured into the cylinder so that the depth of the water became 10 mm; a timer was operated at the same time; and at 105±2 seconds after the timer commenced timing, the water in the cylinder was discarded, while preventing the water from splashing sites other than the test site. Subsequently, the specimen was taken off from the cylinder and the pedestal and placed on a plane with its test surface up; at 120±2 seconds after the timer commenced timing, a dry blotting paper was placed on the specimen; then a metal roller was rolled twice (once forward and once backward) without adding pressure force to remove extra water; and the mass of the specimen was weighed to 1 mg unit immediately.

The water absorptiveness was calculated using the following formula.

$$A=(m2-m1)\times 10000/S \quad \text{(Formula 2)}$$

wherein
A: water absorptiveness (g/m2)
m1: dry mass of the specimen (g)
m2: wet mass of the specimen (g)
S: test area (cm2)
(Air Permeance)

According to the method specified in JIS P8117:2009 "Paper and board-test method of air permeance and air resistance (medium range)—Gurley method", air permeance was determined from the face and the back of a sample using a Gurley tester and indicated in the nearest whole number.

In the present invention, the determination was also performed according to JIS P8117. Specifically, the Gurley air permeance resistance tester was used for the measurement. The tester was placed horizontally so that the inner cylinder was perpendicular and the outer cylinder was filled with oil up to the gauge line at approximately 120 mm on its inner surface. The inner cylinder was raised until it was supported at its top rim by a catch, the specimen was clamped between the clamping plates, the catch was released and the inner cylinder was lowered gently until it was floating in the oil. While the inner cylinder descended, time from when the gauge line of 0 mL passed the rim of the outer cylinder until when the gauge line of 100 mL passed the rim of the outer cylinder was measured.

It could be seen from the results of Table 1 that in the case where the same original sheet was used, as the drawing became intense, the specific gravity decreased but the water absorptiveness increased; and in the case where the water absorptiveness is as large as approximately 10 g/m2·120 seconds, there were large influences by the surface roughness, but in the case where the water absorptiveness was 5 g/m2·120 seconds or less, there was no co-relation with the surface roughness.

Example 2

Shape forming was performed in the same direct method as in Example 1 to manufacture intermediate products for thin film material with one having a thickness of 270 um and the other a thickness of 350 um. With respect to these original sheets, longitudinal drawing was performed by employing a circumferential velocity difference between rolls, and successively horizontal drawing was performed by a sheet-end fixing type tenter. The longitudinal drawing conditions were the same as in Example 1 and the horizontal drawing conditions was a width of the original sheet of 270 mm to 280 mm and a temperature of 95° C. The specific gravity, the water absorptiveness and the air permeance of the thin film material which underwent the sequential drawing were measured.

TABLE 2

| No. | Method of drawing | Thickness of original sheet (μm) | Specific gravity | Water absorptiveness (g/m$^2$ · 120 sec.) | Air permeance (seconds) |
|---|---|---|---|---|---|
| 1 | 1.6 times in longitudinal drawing, 1.5 times in horizontal drawing | 350 | 0.95 | 0.9 | 1300 or more |
| 2 | 2.0 times in longitudinal drawing, 2.0 times in horizontal drawing | 270 | 0.75 | 2.8 | 156 |

Example 3

With respect to the case where only longitudinal drawing was performed and the case where sequential drawing, namely, longitudinal drawing followed by horizontal drawing, was performed, the effect of water absorption time when measuring the water absorptiveness was compared. The results are as shown in the following table. It was found that there was not a large difference between the case where the absorption time was 120 seconds as specified in the JIS method and the case where the absorption time was 30 seconds, and that water is absorbed in a relatively short time.

TABLE 3

| Method of drawing | Specific gravity | Water absorptiveness g/m$^2$ · 30 sec. | g/m$^2$ · 120 sec. |
|---|---|---|---|
| Only longitudinal drawing | 1.39 | 0.3 | 0.5 |
| Sequential drawing of longitudinal drawing and horizontal drawing | 0.95 | 0.7 | 0.9 |

Example 4

The polyethylene resin thin film material highly blended with calcium carbonate (the thin film material having a weight ratio of polyethylene resin and calcium carbonate of 20:80, a water absorptiveness of 4.0 g/m2·120 seconds and an air permeance of 1300 seconds or more) was coated with polyvinyl alcohol resin having a thickness of approximately 1 μm using a reverse micro gravure coater. Upon assessing the contact angle of the coated face using pure water, it was 77°. Incidentally, the contact angle was measured by placing a droplet of pure water on the surface of the material to be measured and measuring the angle made by the liquid surface and the material surface when equilibrium was reached.

Subsequently, an aqueous solution of a resin for ink jet receiving layer (manufactured by Takamatsu Oil and Fat Co., Ltd.) was similarly applied by using the reverse micro gravure coater so that the coating amount after drying was 14 g/m2.

Comparative Example

Pulp paper was coated with the same resin as used in Example 4 so that the coating amount after drying was 30 g/m2.

Evaluation

Adhesion of the provided ink jet receiving layer was measured by the cross-cut method of JIS K 5600 by using Example 4 and Comparative Example. Further, the thin film material of A4 size was prepared, and a picture of A3 size was printed in color using aqueous inks and the ink jet printer "Canon IPE 6100" with an output mode of 600 dpi, so as to evaluate the image visually. The results are shown in Table 4.

(Adhesion Test: Cross-Cut Method)

Using the obtained sheets of Example 4 and Comparative Example in each of which a receiving layer was formed, a cross-cut test was performed with respect to the receiving layers according to JIS 5600-5-6 to evaluate adhesion as being good or bad.

(Image Evaluation)

A test pattern in black was printed and clearness of the image was evaluated visually.

TABLE 4

| Sample | Coating amount of receiving layer (g/m$^2$) | Adhesion | Clearness of image |
|---|---|---|---|
| Example 4 | 14 | Good | Good |
| Comparative Example | 30 | Good | Slightly good |

In the case where the thin film material for processing use of the present invention was used, the adhesion of the formed receiving layer was sufficient, though the amount of resin to form the ink jet receiving layer was low. Further, as ink jet paper, color development of ink and the like was excellent and comparable to conventional ink jet paper in which pulp is used. In other words, compared to the cases where ordinary pulp is used, it is possible to reduce the amount of resin required to form the ink jet receiving layer and to obtain an image in which clearness is good, and therefore, it is possible to provide ink jet paper with good quality at a low cost.

The invention claimed is:

1. A thin monolayer film comprising a thermoplastic resin and an inorganic substance powder at a weight ratio of 18:82 to 50:50, wherein the thin monolayer film comprising the thermoplastic resin and the inorganic substance powder at a weight ratio of 18:82 to 50:50 has each of:
    a specific gravity of 0.60 or more and 1.40 or less,
    a water absorptiveness as measured by a Cobb method in accordance with JIS P 8140 of 0.0 g/m2·120 sec. or more and 11.0 g/m2·120 sec. or less, and
    an air permeance of 800 seconds or more as measured by the Gurley tester method, such that coatability and processability of the thin monolayer film are increased.

2. The thin monolayer film according to claim 1, wherein the water absorptiveness as measured by the Cobb method is 0.0 g/m2·120 sec. or more and 5.0 g/m2·120 sec. or less.

3. A laminate film having a layer comprising a process material on at least one surface of the thin monolayer film according to claim 1.

4. A method for manufacturing a laminate film by laminating a process material on at least one surface of the thin monolayer film according to claim 1.

5. The thin monolayer film according to claim 1, wherein the contact angle of water on the surface of the thin monolayer film is 40 degrees or more and 90 degrees or less.

* * * * *